(12) United States Patent
Lan et al.

(10) Patent No.: US 10,789,482 B2
(45) Date of Patent: Sep. 29, 2020

(54) ON-LINE ACTION DETECTION USING RECURRENT NEURAL NETWORK

(71) Applicant: Microsoft Technology Licensing, LLC, Redmond, WA (US)

(72) Inventors: Cuiling Lan, Beijing (CN); Wenjun Zeng, Beijing (CN); Yanghao Li, Beijing (CN); Junliang Xing, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 16/082,265

(22) PCT Filed: Mar. 28, 2017

(86) PCT No.: PCT/US2017/024629
§ 371 (c)(1),
(2) Date: Sep. 4, 2018

(87) PCT Pub. No.: WO2017/176511
PCT Pub. Date: Oct. 12, 2017

(65) Prior Publication Data
US 2019/0080176 A1 Mar. 14, 2019

(30) Foreign Application Priority Data
Apr. 8, 2016 (CN) .......................... 2016 1 0218351

(51) Int. Cl.
*G06K 9/00* (2006.01)
*G06N 3/04* (2006.01)
*G06N 3/08* (2006.01)

(52) U.S. Cl.
CPC ..... *G06K 9/00744* (2013.01); *G06K 9/00335* (2013.01); *G06K 9/00342* (2013.01);
(Continued)

(58) Field of Classification Search
CPC .......... G06K 9/00335; G06K 9/00342; G06K 9/00711; G06K 2009/00738;
(Continued)

(56) References Cited

U.S. PATENT DOCUMENTS 8,634,638 B2 1/2014 Han et al. ...................... 382/159
8,687,078 B2 4/2014 Bigioi et al. ............... 348/222.1
(Continued)

OTHER PUBLICATIONS

Jain et al., "Recurrent Neural Networks for Driver Activity Anticipation via Sensory-Fusion Architecture", 2016 IEEE Int'l Conf. on Robotics and Automation, May 2016, 8 pages.*
(Continued)

*Primary Examiner* — Andrew W Johns

(57) ABSTRACT

In implementations of the subject matter described herein, an action detection scheme using a recurrent neural network (RNN) is proposed. Representation information of an incoming frame of a video and a predefined action label for the frame are obtained to train a learning network including RNN elements and a classification element. The representation information represents an observed entity in the frame. Specifically, parameters for the RNN elements are determined based on the representation information and the predefined action label. With the determined parameters, the RNN elements are caused to extract features for the frame based on the representation information and features for a preceding frame. Parameters for the classification element are determined based on the extracted features and the predefined action label. The classification element with the determined parameters generates a probability of the frame being associated with the predefined action label. The parameters for the RNN elements are updated according to the probability.

15 Claims, 11 Drawing Sheets

(52) U.S. Cl.
CPC .......... *G06K 9/00711* (2013.01); *G06N 3/04* (2013.01); *G06N 3/0445* (2013.01); *G06N 3/0454* (2013.01); *G06N 3/08* (2013.01)

(58) Field of Classification Search
CPC ...... G06K 9/00744; G06T 2207/20081; G06T 2207/20084; G06T 2207/30196; G06N 3/0445; G06N 3/0454; G06N 3/049; G06N 3/08
See application file for complete search history.

(56) References Cited

U.S. PATENT DOCUMENTS

| | | | |
|---|---|---|---|
| 10,416,755 B1* | 9/2019 | Erivantcev et al. | G06F 3/011 |
| 2002/0102024 A1 | 8/2002 | Jones et al. | 382/225 |
| 2013/0202210 A1 | 8/2013 | Ryoo et al. | 382/195 |
| 2019/0108399 A1* | 4/2019 | Escorcia et al. | G06N 3/0445 |

OTHER PUBLICATIONS

Ordóñez et al., "Deep Convolutional and LSTM Recurrent Neural Networks for Multimodal Wearable Activity Recognition", Sensors, vol. 16, No. 1, Jan. 18, 2016, 25 pages.*
Aryanfar, et al., "Multi-View Human Action Recognition Using Wavelet Data Reduction and Multi-Class Classification", In Proceedings of the 2015 International Conference on Soft Computing and Software Engineering, Mar. 5, 2015, pp. 585-592.
Baccouche, et al., "Sequential Deep Learning for Human Action Recognition", In Proceedings of the Second International Workshop on Human Behavior Understanding, Nov. 16, 2011, pp. 29-39.
Bloom, et al., "G3d: A Gaming Action Dataset and Real Time Action Recognition Evaluation Framework", In Proceedings of The IEEE Computer Society Conference on Computer Vision and Pattern Recognition Workshops, Jun. 16, 2012, pp. 7-12.
Chen, et al., "Joint Cascade Face Detection and Alignment", In Proceedings of the 13th European Conference on Computer Vision, Sep. 6, 2014, pp. 109-122.
Dantone, et al., "Human Pose Estimation using Body Parts Dependent Joint Regressors", In Proceedings of the IEEE Conference on Computer Vision and Pattern Recognition, Jun. 23, 2013, pp. 3041-3048.
Donahue, et al., "Long-term Recurrent Convolutional Networks For Visual Recognition and Description", In Proceedings of the IEEE Conference on Computer Vision and Pattern Recognition, vol. 39, Issue 4, Jun. 7, 2015, pp. 2625-2634.
Du, et al., "Hierarchical Recurrent Neural Network for Skeleton based Action Recognition", In Proceedings of IEEE Conference on Computer Vision and Pattern Recognition, Jun. 7, 2015, pp. 1110-1118.
Everingham, et al., "The Pascal Visual Object Classes (VOC) Challenge", In Proceedings of The International Journal of Computer Vision, vol. 88, Issue 2, Sep. 9, 2009, pp. 303-338.
Felzenszwalb, et al., "Cascade Object Detection with Deformable Part Models", In Proceedings of The IEEE 23rd Conference on Computer Vision and Pattern Recognition, Jun. 13, 2010, pp. 2241-2248.
Freund, et al., "Experiments with a New Boosting Algorithm", In Proceedings of the Thirteenth International Conference of Machine Learning, Jul. 3, 1996, 9 Pages.
Giel, et al., "Recurrent Neural Networks and Transfer Learning for Action Recognition", Retrieved From: https://pdfs.semanticscholar.org/ef2a/5a26448636570986d5cda8376da83d96ef87.pdf, Dec. 15, 2015, 6 Pages.
Glocker, et al., "Joint Classification-Regression Forests for Spatially Structured Multi-Object Segmentation", In Proceedings of The European Conference on Computer Vision, Oct. 7, 2012, 12 Pages.
Graves, Alex, "Supervised Sequence Labelling with Recurrent Neural Networks", In Publication of Springer, Feb. 6, 2012, 137 Pages.
Hoai, et al., "Max-Margin Early Event Detectors", In The International Journal of Computer Vision archive, vol. 107, Issue 2, Apr. 2014, pp. 191-202.
Hochreiter, et al., "Gradient Flow in Recurrent Networks: The Difficulty of Learning Long-Term Dependencies", In Book of "A Field Guide to Dynamical Recurrent Networks", Published by John Wiley and Sons, Jan. 15, 2001, pp. 1-15.
Hochreiter, et al., "Long Short-Term Memory", In Journal of Neural Computation, vol. 9, Issue 8, Nov. 15, 1997, pp. 1735-1780.
Jain, et al., "Action Localization with Tubelets From Motion", In Proceedings of The IEEE Conference on Computer Vision and Pattern Recognition, Jun. 23, 2014, pp. 740-747.
Li, et al., "Action Recognition Based on A Bag of 3D Points", In proceedings of IEEE Computer Society Conference on Computer Vision and Pattern Recognition Workshops, Jun. 23, 2010, pp. 9-14.
Li, et al., "Online Action Detection using Joint Classification-Regression Recurrent Neural Networks", In Proceedings of The European Conference on Computer Vision, Oct. 11, 2016, pp. 203-220.
Lipton,, et al., "A Critical Review of Recurrent Neural Networks for Sequence Learning", In Journal of the Computing Research Repository, Jun. 5, 2015, Jun. 5, 2015, 38 Pages.
Lowe, David G., "Distinctive Image Features from Scale-Invariant Keypoints", In The International Journal of Computer Vision, vol. 60, Issue 2, Nov. 1, 2004, 28 Pages.
Martens, et al., "Learning Recurrent Neural Networks with Hessian-Free Optimization", In Proceedings of The 28th International Conference on Machine Learning, Jun. 28, 2011, 8 Pages.
Meshry, et al., "Action Detection from Skeletal Data Using Efficient Linear Search", In Journal of the Computing Research Repository, Feb. 2015, 5 Pages.
Oikonomopoulos, "Spatiotemporal Localization and Categorization of Human Actions in Unsegmented Image Sequences", In Journal of IEEE Transactions on Image Processing, vol. 20, Issue 4, Apr. 2011, 32 Pages.
Rosa, et al., "Online Action Recognition via Nonparametric Incremental Learning", In Proceedings of The British Machine Vision Conference, Sep. 1, 2014, 15 Pages.
Schulter, et al., "Accurate Object Detection with Joint Classification-Regression Random Forests", In Proceedings of The IEEE Conference on Computer Vision and Pattern Recognition, Jun. 23, 2014, pp. 923-930.
Sharaf, et al., "Realtime Multi-Scale Action Detection From 3d Skeleton Data", In Proceedings of The IEEE Winter Conference on Applications of Computer Vision, Jan. 5, 2015, pp. 998-1005.
Simonyan, et al., "Two-Stream Convolutional Networks for Action Recognition in Videos", In Journal of Advances on Neural Information Processing Systems, Dec. 8, 2014, pp. 1-9.
Siva, et al., "Weakly Supervised Action Detection", In Proceedings British Machine Vision Conference, vol. 2, Aug. 29, 2011, pp. 1-11.
Sun et al., "Temporal Localization of Fine-Grained Actions in Videos by Domain Transfer from Web Images", In Proceedings of The 23rd ACM international Conference on Multimedia, Oct. 26, 2015, pp. 371-380.
Tian, et al., "Spatiotemporal Deformable Part Models for Action Detection", In Proceedings of The IEEE Conference on Computer Vision and Pattern Recognition, Jun. 23, 2013, pp. 2642-2649.
Tran, et al., "Max-Margin Structured Output Regression for Spatio-Temporal Action Localization", In Proceedings of The 26th Annual Conference on Neural Information Processing Systems, Dec. 3, 2012, 9 Pages.
Viola, et al., "Rapid Object Detection Using a Boosted Cascade of Simple Features", In the Proceedings of the 2001 IEEE Computer Society Conference on Computer Vision and Pattern Recognition, vol. 1, Dec. 8, 2001, pp. 511-518.
Wang, et al., "Action Recognition by Dense Trajectories", In Proceedings of 24th IEEE Conference on Computer Vision and Pattern Recognition, Jun. 20, 2011, pp. 3169-3176.
Wei, et al., "Concurrent Action Detection with Structural Prediction", In Proceedings of The IEEE International Conference on Computer Vision, Dec. 1, 2013, pp. 3136-3143.

(56) References Cited

OTHER PUBLICATIONS

Werbos, Paul J., "Backpropagation Through Time: What It Does and How to Do It", In Proceedings of the IEEE, vol. 78 Issue 10, Oct. 1, 1990, pp. 1550-1560.

Wollmer, et al., "On-line Driver Distraction Detection Using Long Short-Term Memory", In Proceedings of IEEE Transactions on Intelligent Transportation Systems, vol. 12, Issue 2, Mar. 17, 2011, pp. 574-582.

Wu, et al., "Modeling Spatial-Temporal Clues in a Hybrid Deep Learning Framework for Video Classification", In the Proceedings of the 23rd ACM International Conference on Multimedia, Oct. 26, 2015, pp. 461-470.

Yeung, et al., "End-to-end Learning of Action Detection from Frame Glimpses in Videos", In Journal of the Computing Research Repository, vol. 1511, Nov. 22, 2015, 10 Pages.

Yeung, et al., "Every Moment Counts: Dense Detailed Labeling of Actions in Complex Videos", In Journal of Computer Research Repository, Jul. 21, 2015, 10 Pages.

Yu, et al., "Fast Action Proposals for Human Action Detection and Search", In Proceedings of The IEEE Conference on Computer Vision and Pattern Recognition (CVPR), Jun. 7, 2015, pp. 1302-1311.

Yu, et al., "Predicting Human Activities using Spatio-Temporal Structure of Interest Points", In Proceedings of The 20th ACM International Conference on Multimedia, Oct. 29, 2012, 4 Pages.

Yun, et al., "Two-Person Interaction Detection Using Body-Pose Features and Multiple Instance Learning", In Proceedings of IEEE Conference on Computer Vision and Pattern Recognition Workshops, Jun. 16, 2012, 8 Pages.

Zanfir, et al., "The Moving Pose: An Efficient 3d Kinematics Descriptor for Low-Latency Action Recognition and Detection", In Proceedings of The IEEE International Conference on Computer Vision, Dec. 1, 2013, pp. 2752-2759.

Zhu, et al., "Cooccurrence Feature Learning for Skeleton Based Action Recognition Using Regularized Deep LSTM Networks", In Proceedings of The Thirtieth AAAI Conference on Artificial Intelligence, Feb. 12, 2016, pp. 3697-3703.

\* cited by examiner

US 10,789,482 B2

ON-LINE ACTION DETECTION USING RECURRENT NEURAL NETWORK

BACKGROUND

Detection of actions or activities of various entities (e.g., humans, robots, animals, or other moving objects) has many useful applications, including surveillance, health care, human-computer interaction, intelligent robot navigation, computer games, and so on. Typically, an action classifier (model) is trained on videos related to one or more known actions. Once trained, the model may be used to process incoming video to determine whether a particular action takes place. Despite efforts over many years, effective detection of actions of entities continues to be a challenging task.

SUMMARY

In accordance with implementations of the subject matter described herein, an action detection scheme using a recurrent neural network (RNN) is proposed. Representation information of an incoming frame of a video and a predefined action label for the frame are obtained to train a learning network including RNN elements and a classification element. The representation information represents an observed entity in the frame. Specifically, parameters for the RNN elements are determined based on the representation information and the predefined action label. With the determined parameters, the RNN elements are caused to extract features for the frame based on the representation information and features for a preceding frame. Parameters for the classification element are determined based on the extracted features and the predefined action label. The classification element with the determined parameters generates a probability of the frame being associated with the predefined action label. The parameters for the RNN elements are updated according to the probability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

Figure 1:
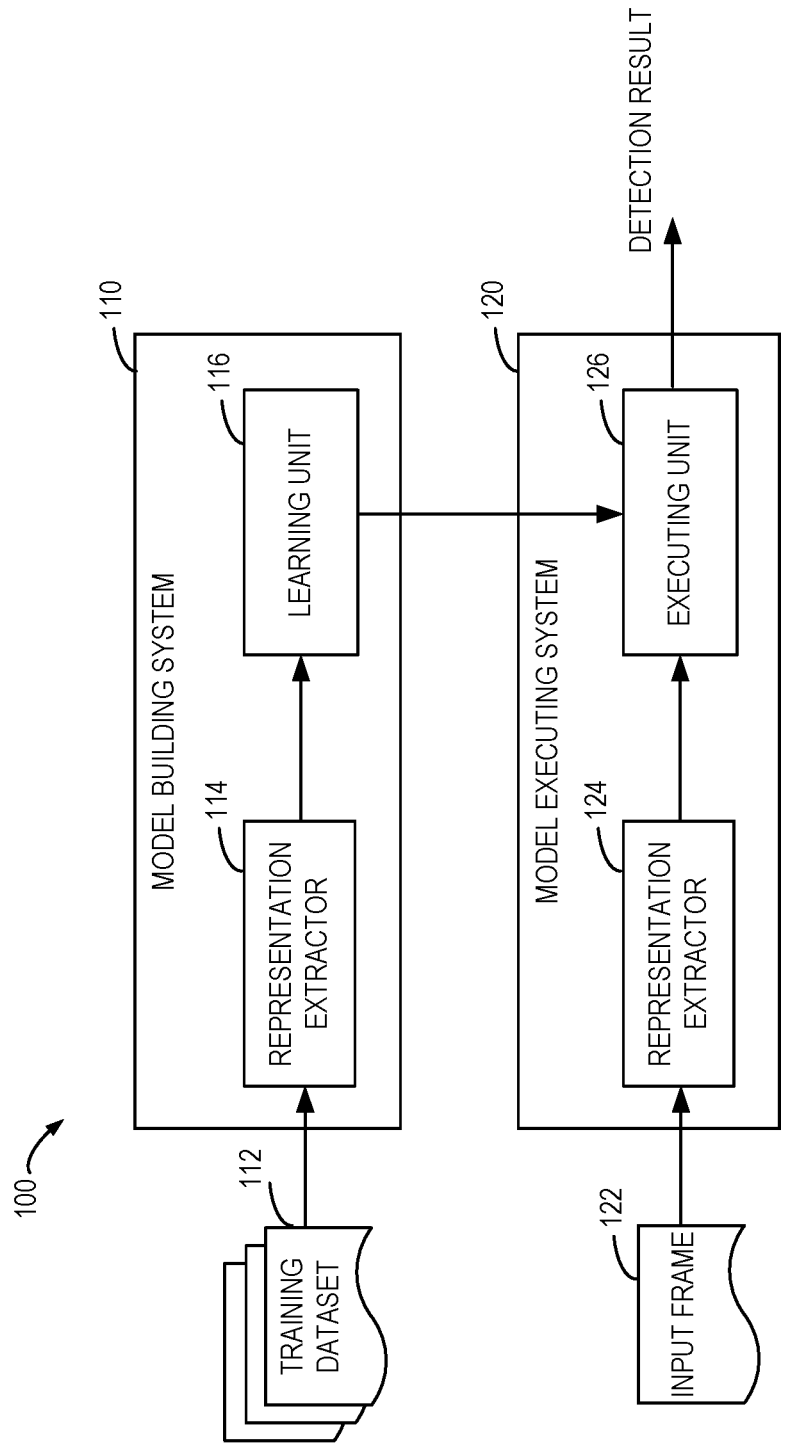
FIG. 1 illustrates a block diagram of an environment where implementations of the subject matter described herein can be implemented.

FIG. 1 shows a block diagram of an environment 100 where implementations of the subject matter described herein can be implemented. It is to be understood that the structure and functionality of the environment 100 are described only for the purpose of illustration without suggesting any limitations as to the scope of the subject matter described herein. The subject matter described herein can be embodied with a different structure and/or functionality.

The environment 100 includes a model building system 110 and a model executing system 120. The model building system 110 is configured to build a model for action detection from a training dataset 112. The dataset 112 may include one or more labeled videos. One or more of the frames in the videos may be labeled as being associated with a predefined action of an observed entity or entities in the frames. For example, the frames may be classified as being associated with predefined actions including drinking, eating, writing, washing hands, opening an appliance, sweeping, gargling, throwing trash, wiping, and the like. The observed entities may be, for example, humans, robots, animals, or other moving objects. Any other actions of the entities in the frames may also be recognized and labeled. The labeling of the frames may be performed automatically and/or manually. The action labels of the frames may also be provided in the dataset 112.

A representation extractor 114 included in the model building system 110 may be configured to extract representation information of respective frames in the videos in the dataset 112. Generally, the frames of the videos may not be directly used to train the model for action detection. Instead, a smaller amount of information characterizing the entity or entities in the frames may be extracted to train the model, which will help improve the accuracy and efficiency of the training process. Representation information of a frame may represent an observed entity in the frame. In some cases, if more than one entity is included in a frame, the representation information of the entity of interest may be determined. Alternatively, representation information of all the entities in the frame may be used.

In some implementations, the representation information may be skeleton representation of the observed entity or entities in the frame. The skeleton representation may include information of at least one joint of the observed entity/entities in the frame, including two-dimensional ("2D") or three-dimensional ("3D") position information of the joint(s). The joint information may be obtained by identifying the skeleton structure(s) of the entity/entities from a two-dimensional image of the frame or by taking the video utilizing depth cameras. Alternatively, or in addition, other representation information may be used, such as Histograms of Oriented Gradient (HOG) in an intensity image or information extracted by an algorithm of Scale-Invariant Feature Transform (SIFT).

A learning unit 116 included in the model building system 110 is configured to learn a model for action detection based on the representation information and predefined action labels of the frames in the training dataset 112. A structure of the model may be constructed first. The objective of the training process is to determine parameters for the structure of the model. The model may be represented as one or more functions of the representation information of the frames and the corresponding action labels.

In some implementations, the trained model from the model building system 110 may be provided to the model executing system 120 for recognize an action from one or more new frames. Specifically, a representation extractor 124 receives an input frame 122 and extracts representation information of the frame. The representation information may be provided to an executing unit 126 as an input to the trained model. An output of the model may indicate whether the frame is associated with any of the predefined action labels. Generally, a plurality of frames related to those predefined action labels have been used to train the model in the model building system 110.

Although the representation extractor 114 is shown as being included in the system 110 in FIG. 1, in some implementations, the representation extractor 114 may be separated from the system 110. The training frames may be processed by a remote representation extractor. The dataset 112 input to the model building system 110, for example, to the learning unit 116, may then include the extracted representation information of frames and corresponding predefined action labels. In some implementations, the representation extractor 124 may also be separated from the model executing system 120.

The general concept of the environment 100 has been described above with reference to FIG. 1. In conventional modeling approaches, an action detection model is trained based on information of a plurality of frames covering the whole periods of predefined actions. Most of the approaches employ a sliding window to divide videos into overlapped segments and train the model in unit of segments. A segment or the frames within the segment may be labeled as being associated with a particular action. Such sliding window design has low computational efficiency and it is not easy to determine the size of the sliding window and thus the resulting model is not suitable for streaming videos with actions of uncertain length. In addition, the models trained with those approaches are only capable of recognizing an action after it is fully observed, by using the frames captured in the duration of the action. This kind of model may be regarded as an off-line action detection model.

As an example, given a sliding window with a size of N frames, a video clip $V=\{v_0, v_t, \ldots, v_{N-1}\}$ including N frames may be segmented from a video, where $v_t$ represents a frame at a point of time t ($0 \le t \le N-1$). It is supposed that there are (M+1) predefined actions. Action labels for all these predefined actions for the frame $v_t$ may be represented as $y_t \in R^{1 \times (M+1)}$. The action labels $y_t$ may be written as a label vector $y_t = \{y_{t,0}, \ldots, y_{t,k}, \ldots, y_{t,M}\}$ including (M+1) action labels associated with (M+1) predefined action. Values of elements in the label vector may be normalized into a range from 0 to 1, where $y_{t,k}=1$ means the presence of an action k in the frame vt and $y_{t,k}=0$ means the absence of the action. One of the predefined action labels may be corresponding to a blank class, representing the situation where the current frame does not include any predefined action.

In the conventional action detection models, the problem of detecting an action from the frame $v_t$ is to maximize the posterior probability with the known video clip $V=\{v_0, \ldots, v_t, \ldots, v_{N-1}\}$, which may be represented as:

$$y_t^* = \underset{y_t}{\mathrm{argmax}} P(y_t \mid V) \qquad (1)$$

where $y_t^*$ represents the detected label vector for the frame $v_t$.

It can be seen from Equation (1) that, for any frame in the video clip V, the label vector $y_t^*$ can be predicted only after all the N frames in the video clip V are observed. However, in many applications, it is desirable to reduce the observation latency and detect an ongoing or impending action as early as possible. For example, in the video surveillance application, timely alert for some criminal or violent incidents occur is important.

In some other cases, it is expected to forecast the start and/or the end of an action prior to its occurrence, which is also an impossible task for the models based on a sliding window. For example, it would be helpful to alert prior to the start of the criminal or violent incidents by forecasting them correctly. For intelligent robots, it would be desirable if they can predict the end of an ongoing action and then get something ready for the persons they serve, for example, passing towels to a person when he/she finishes washing hands.

In accordance with implementations of the subject matter described herein, an on-line action detection scheme is proposed to provide frame-wise action recognition. Compared with the off-line action detection, on-line action detection is to output a detection result for each incoming frame. That is, an on-line action detection model is to be trained to have an ability of detecting an action with the knowledge of the current frame and probably preceding frame(s). The problem of the on-line action detection may be represented as to maximize the posterior probability with a current frame $v_t$ and other frame(s) known currently, which may be represented as follows:

$$y_t^* = \underset{y_t}{\mathrm{argmax}} P(y_t \mid (v_0, \ldots, v_t)) \qquad (2)$$

It can be seen from Equation (2) that the label vector $y^*_t$ is detected from the current frame $v_t$ and frame(s) prior to this frame.

In accordance with implementations of the subject matter described herein, a model used for action detection is constructed as a learning network including recurrent neural network (RNN) elements and a classification element. The learning network with RNN elements may be referred to as a recurrent neural network and the elements included in the network may be referred to as neurons. Hereinafter, the terms "learning network," "learning model," "neural network," and "recurrent neural network" are used interchangeably. The terms "element" and "neuron" are used interchangeably. The RNN neurons may be designed to learn features from the frames (or representation information of the frames). The classification neuron may be used to classify the frames into predefined groups based on the features. As used herein, the term "features" refers to information of (temporal) dynamics of a frame learned by the RNN neurons. With the RNN neurons, the learning network is powerful for outputting a desirable detection result based on limited knowledge.

In some implementations, the learning network may be a multi-layered neural network. The RNN neurons may be arranged as one or more RNN layers, each layer including one or more RNN neurons. The RNN layers may constitute a feature learning sub-network. The first RNN layer receives representation information of an input frame and outputs learned features to the next layer. The other RNN layers continue processing the features and provide the updated features to a subsequent layer. For deep learning and higher accuracy of the learning network, a non-linear fully-connected (FC) layer may be arranged between every two RNN layers. The fully-connected layer may include one or more neurons for feature fusion and update the features from a RNN layer based on a non-learn function.

A RNN neuron has a self-connected recurrent connection which models the temporal evolution, considering both the current input and its preceding output. To better understand the neural network, a typical processing in a RNN layer with a plurality of RNN neurons may be represented as below:

$$h_t = \theta(W_{xh}x_t + W_{hh}h_{t-1} + b_h) \quad (3\text{-}1)$$

where $h_t$ represents the output response of the RNN layer at a point of time t, $x_t$ represents the input of the RNN layer at a point of time t; $W_{xh}$ represents a mapping matrix from the input $x_t$ to the output $h_t$, $W_{hh}$ represents a mapping matrix instead the RNN layer from the preceding output $h_{t-1}$ at a preceding point of time t−1 to the current output $h_t$, $b_h$ represents a bias vector, and $\theta(\cdot)$ represents a non-linear function. The non-linear function may be a tangent function, a sine function, a sigmoid function, or any other function that can apply non-linearity to the input. It will be noted that the recursive computation in the RNN neurons may be represented in other forms.

Figure 2:
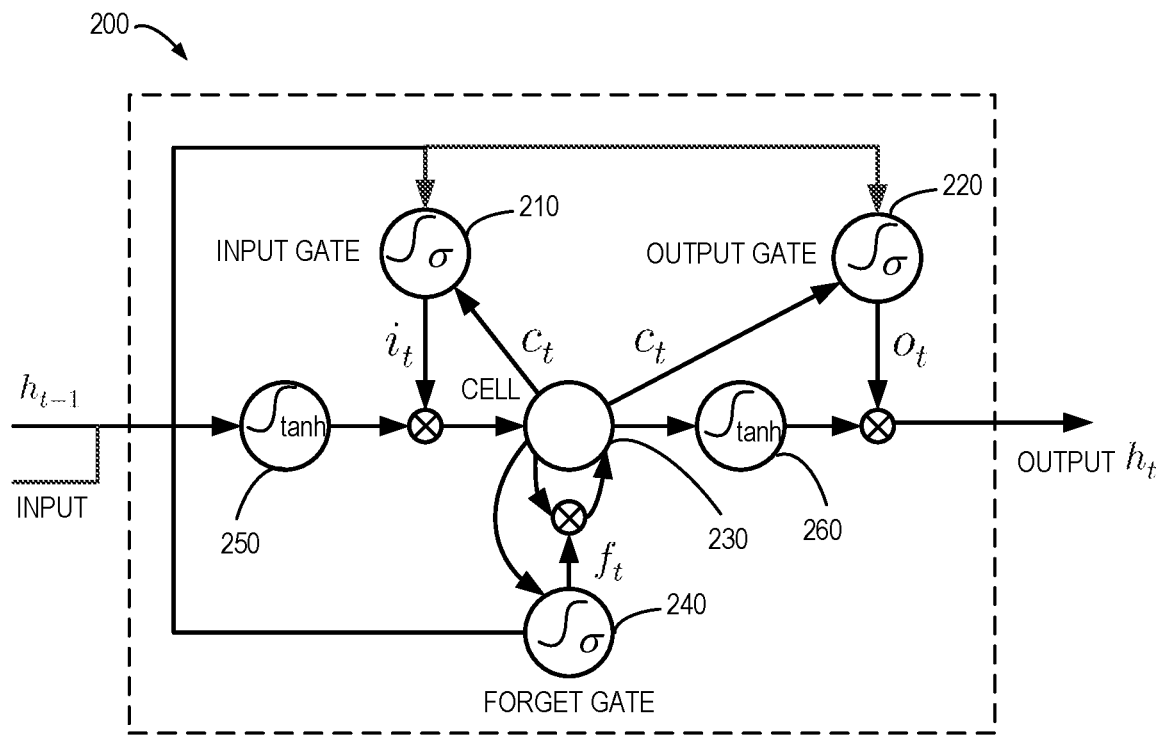
FIG. 2 illustrates a block diagram of a structure of a typical LSTM neuron in accordance with one implementation of the subject matter described herein.

In some implementations, the RNN elements may suffer from vanishing gradient effect. To overcome this limitation, long short-term memory (LSTM) neurons may be used instead of the normal RNN neurons. A structure of a typical LSTM neuron 200 is shown in FIG. 2. As shown, the LSTM neuron 200 includes an input gate 210, an output gate 220, a memory cell 230, a forget gate 240, and two non-linear cells 250 and 260. The input gate 210 and the forget gate 240 control the information flow into and out of the memory cell 230. The output gate 220 controls how much information from the memory cell 230 is passed to the output $h_t$ of the LSTM neuron 200. The memory cell 230 has a self-connected recurrent edge of weight 1, ensuring that the gradient can pass across many time steps without vanishing or exploding. Therefore, this structure allows the LSTM neuron 200 to memorize and access information many time steps ago, overcoming the difficulties in training the neural network caused by the vanishing gradient effect.

For an RNN layer including a plurality of LSTM neurons 200, the recursive computation of activations of the units in the LSTM neurons 200 at a point of time t may be represented as follows:

$$i_t = \sigma(W_{xi}x_t + W_{hi}h_{t-1} + W_{ci}c_{t-1} + b_i), \quad (3\text{-}2)$$

$$f_t = \sigma(W_{xf}x_t + W_{hf}h_{t-1} + W_{cf}c_{t-1} + b_f), \quad (4)$$

$$c_t = f_t \square c_{t-1} + i_t \square \tan h(W_{xc}x_t + W_{hc}h_{t-1} + b_c), \quad (5)$$

$$o_t = \sigma(W_{xo}x_t + W_{ho}h_{t-1} + W_{co}c_t + b_o), \quad (6)$$

$$h_t = o_t \square \tan h(c_t), \quad (7)$$

where $\square$ represents an element-wise product, $\Gamma(\alpha)$ represents a sigmoid function defined as $\Gamma(\alpha) = 1/(1+e^{-\alpha})$, $x_t$ represents the input of the RNN layer at a point of time t; $W_{\alpha,\beta}$ represents a mapping matrix between $\alpha$ and $\beta$ (for example, $W_{xi}$ represents a mapping matrix from the input $x_t$ to the input gate $i_t$), $h_t$ represents the output response of the RNN layer at a point of time t, and $b_\beta$ represents the bias vector of $\beta$ with $\beta \in \{i,f,c,o\}$. It will be noted that the recursive computations in the LSTM neurons may be represented in other forms.

From the above Equations (3-1) and (3-2) to (7), it can be seen that the output response of an RNN layer $h_t$ at the point of time t is generated based on the input $x_t$ and the output response of this RNN layer $h_{t-1}$ at a preceding point of time t−1. The output response $h_t$ or $h_{t-1}$ includes features of an input frame extracted by this layer at the time t or t−1. Depending on the location of the RNN layer in the neural network, the input of the RNN layer $x_t$ may be representation information of an input frame or features determined by the preceding layer.

In some implementations, the processing in a FC layer may be represented as follows:

$$h_t = \theta(W_{xh}x_t + b_h) \quad (8)$$

where $h_t$ represents the output response of the FC layer at a point of time t, $x_t$ represents the input of the FC layer at the point of time t, $W_{xh}$ represents a mapping matrix from the input $x_t$ to the output $h_t$ of the FC layer, $b_h$ represents a bias vector, and $\theta(\cdot)$ represents a non-linear function. The non-linear function may be a tangent function, a sine function, a sigmoid function, or any other function that can apply non-linearity to the input.

In some implementations, the last layer in the learning network may be regarded as a classifier used to determine a probability of a frame being associated with a predefined action label (or a label vector if multiple actions are predefined) based on the features. The classification branch may constitute a classification sub-network. In some implementations, more than one neuron (element) may be used. The number of the neurons in the classification branch may depend on the number of predefined action labels. Each of the neurons may be used to perform prediction for a specific action label. The classification layer may generate a label vector, such as a label vector $y_t$ as described above, with each element of the vector indicating the probability of the frame being associated with the corresponding action label.

The classification layer sometimes may also be referred to as a SoftMax layer in the neural network for the classification task.

In some examples, the determination of a predefined action label $y_t$ for a frame $v_t$ in the SoftMax layer may be represented as follows:

$$P(y_t \mid v_0, \ldots v_t) = \frac{e^{q_k}}{\sum_{i=0}^{M} e^{q_i}}, \quad (9)$$

$$q = W_{hq} h_t + b_q, \quad (10)$$

where $y_t = \{y_{t,0}, \ldots, y_{t,k}, \ldots, y_{t,M}\}$ represents a label vector including (M+1) action labels associated with (M+1) predefined action, $P(y_t \mid v_0, \ldots v_t)$ represents the possibility of the frame $v_t$ being associated with the label vector $y_t$, $h_t$ represents the features received by the SoftMax layer from the preceding layer in the neural network at the time t, $W_{hq}$ represents a mapping matrix from the preceding layer to the SoftMax layer, $q = \{q_0, \ldots, q_i, \ldots q_M\}$ represents the output response of the SoftMax layer, and $b_q$ represents a bias vector. As described above, values of the elements in the label vector may indicate the probabilities for the presence of corresponding actions.

Figure 3:
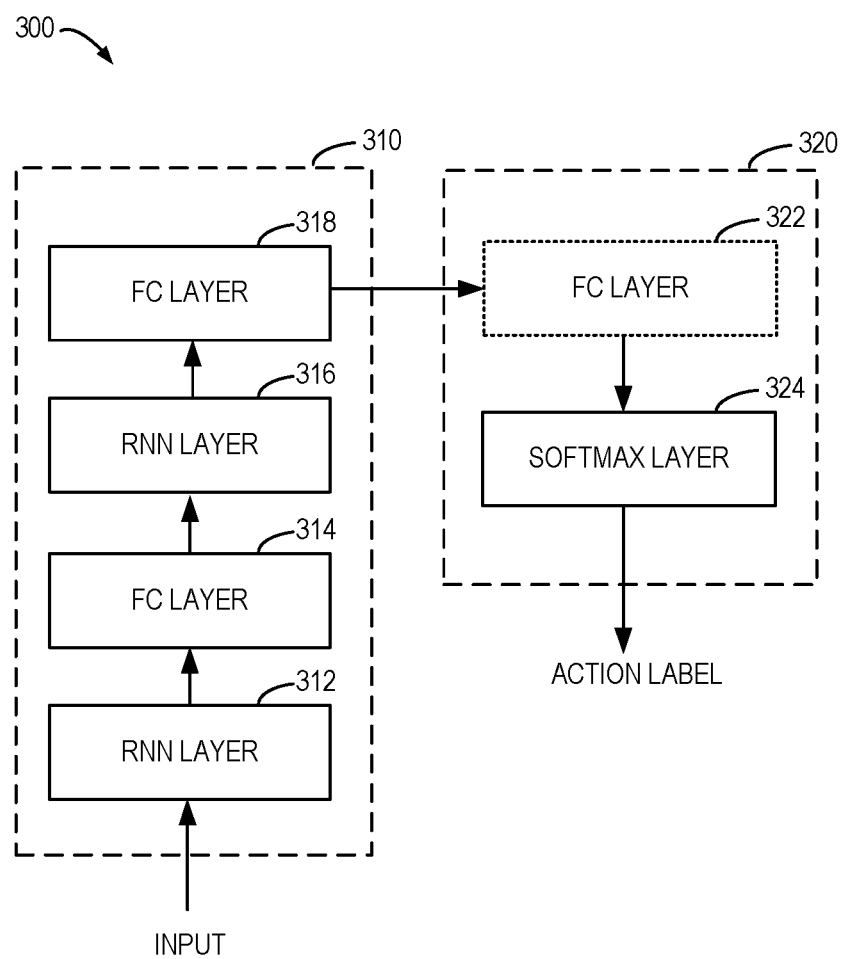
FIG. 3 illustrates a block diagram of a structure of a learning network in accordance with one implementation of the subject matter described herein.

FIG. 3 shows a block diagram of a structure of a learning network 300. As shown, the learning network 300 includes a feature learning sub-network 310 and a classification sub-network 320. The feature learning sub-network 310 may include one or more RNN layers, for example, RNN layers 312 and 316, each including one or more LSTM neurons (such as LSTM neurons 200). The feature learning sub-network 310 may also include one or more FC layers, for example, FC layers 314 and 318, each including one or more neurons. Each of the FC layers may be arranged between two RNN layers to perform feature fusion on the features received from the preceding RNN layer and provide the updated features into the subsequent RNN layer.

It would be appreciated that although two RNN layers and two FC layers are shown, the feature learning sub-network 310 may include additional RNN layers or FC layers, or some of the RNN layers or FC layers may be omitted. In some implementations, the feature learning sub-network 310 may include only one RNN layer including a plurality of LSTM neurons or normal RNN neurons. In some other implementations, the feature learning sub-network 310 may include two or more consecutive RNN layers or FC layers. That is, the RNN layers and FC layers may not be required to be arranged in an alternate way.

The classification sub-network 320 may include a Soft-Max layer 324 including one or more neurons for predefined action label(s). The SoftMax layer 324 may be used to determine the probability distributions for the frames among the predefined action labels based on the features from the last layer of the feature learning sub-network 310. In some implementations, a further FC layer 322 is included in the classification sub-network 320 to perform further feature fusion on the features received from the feature learning sub-network 310.

With the structure determined, a dataset including labeled frames of videos may be used to train the learning network 300. Each of the frames may be labeled with a corresponding action label or label vector. The objective of the training is to determine the parameters for the neurons included in the learning network 300, for example, to determine the mapping matrices (and bias vectors) for the RNN layers 312 and 316, the FC layers 314, 318, and 322, and the SoftMax layer 324 as shown in Equations (3-1) or (3-1) to (6), and Equations (8) and (10). To achieve on-line action detection, the learning network is to be trained to achieve the ability of detecting an action based on the current frame and probably the frames prior to the current frame. The RNN layers may be constructed to be unidirectional layers to use the past information only to learn features for the current frame.

Based on the structure of the learning network 300, in some implementations, the parameters for the feature learning sub-network 310 and the classification sub-network 320 may be determined based on the training dataset including representation information of the frames and corresponding predefined action labels. In some implementations, training methods such as alternating least square (ALS), stochastic gradient descent (SGD), or limited-memory BFGS (Broyden, Fletcher, Goldfarb, and Shanno) may be employed to train the learning network 300. Additionally, a Back Propagation Through Time (BPTT) method may be used to update the parameters in the iteration process.

In some implementations, the parameters for the neurons included in the learning network 300 may be initialized to, for example, some random values. In some implementations, the parameters for the feature learning sub-network 310 may be trained first based on the representation information of the respective frames and the predefined action labels. In these implementations, the parameters for the classification sub-network 320 may be fixed first. After the feature learning sub-network 310 is trained, the parameters for the classification sub-network 320 may be determined based on the features for the frames generated by the feature learning sub-network 310 with the trained parameters as well as the predefined action labels. During the training of the classification sub-network 320, parameters for the feature learning sub-network 310 may be updated based on the parameters of the classification sub-network 320 by employing the BPTT method. In some implementations, if the parameters determined previously have converged, then the updating may not be performed. Alternatively, the feature learning sub-network 310 and the classification sub-network 320 may be trained jointly. In this case, the parameters for the feature learning sub-network 310 and the classification sub-network 320 may be updated one time in each round of iteration.

It would be appreciated that the learning network 300 may be trained frame-by-frame in an iteration process for either the separate training or the joint training of the sub-networks 310 and 320. When representation information of a frame is passed into the first layer of the feature learning sub-network 310, for example, the RNN layer 312, features for the LSTM neurons may be initially determined. The RNN layer 312 with the determined parameters may generate features for the frame based on the representation information and the features for preceding frames (which are already learned by the LSTM neurons of the RNN layer 312). The features may be passed to a subsequent layer, for example, the FC layer 314 for feature fusion. The features for the frame are fused and updated in the feature learning sub-network 310 on a layer-by-layer basis. During this process, the parameters of the neurons included in these layers are updated accordingly. The determination of the parameters for the feature learning sub-network 310 is aimed to reduce the difference between the output of the learning network generated by using the parameters and the actual output.

The features generated by the last layer of the sub-network 310 may be provided into the classification sub-network 320. An optional FC layer, for example, the FC layer 322 may perform additional feature fusion on the received features. The updated features may be provided to the SoftMax layer 324 to determine parameters for the neurons included in this layer. The determination of the parameters for the neurons is also aimed to reduce the difference between the output of the learning network generated by using the parameters and the actual output.

In some implementations, the objective function for training the learning network 300 (for either the separate training or the joint training of the sub-networks 310 and 320) is to reduce or minimize the maximum likelihood loss function as follows:

$$\min L_c(v_t) = \min\left(-\sum_{k=0}^{M} z_{t,k} \ln P(y_{t,k} | v_0, \ldots, v_t)\right), \quad (11)$$

where $L_c(v_t)$ represents the loss function of the learning network 300 for an input frame $v_t$, $P(y_{t,k}|v_0, \ldots, v_t)$ represents the probability of the frame $v_t$ being associated with a predefined action label k in the label vector $y_t = \{y_{t,0}, \ldots, y_{t,k}, \ldots, y_{t,M}\}$ to be determined by the learning network 300, $z_{t,k}$ is an element in the predefined label vector $z_t = \{z_{t,0}, \ldots, z_{t,k}, \ldots, z_{t,M}\}$ and represents the ground-truth label of the frame $v_t$ with respect to the action label k, and thus $z_{t,k}=1$ which means that the frame $v_t$ includes an action corresponding to the action label k while values of other elements may be 0. (M+1) represents the number of the predefined action labels (corresponding to the number of the predefined actions).

It can be seen from Equation (11) that, for the parameter determination of the feature learning sub-network 310 or the classification sub-network 320, these parameters are updated each time by small values, to provide a higher probability $P(y_{t,k}|v_0, \ldots, v_t)$ for the element $y_{t,k}$ in the label vector $y_t$ and provide lower probabilities for other elements (which means that the difference between the label vector $y_t$ and the predefined label vector $z_t$ is reduced), which thus reduces the loss function $L_c(v_t)$.

In some implementations, the objective function may be designed to obtain the minimum results for frames over a period of time. The objective function for training the learning network 300 may be rewritten as follows:

$$\min L_c(V) = \min\left(-\frac{1}{N}\sum_{t=0}^{N-1}\sum_{k=0}^{M} z_{t,k} \ln P(y_{t,k} | v_0, \ldots, v_t)\right), \quad (12)$$

where $L_c(V)$ represents the loss function for a video clip with N frames, and N represents the number of frames considered to minimize the loss function. In some examples, N may be the total number of frames in a video. In some other examples, N may be a predetermined number of frames.

It would be appreciated that with the structure of the learning network, many other training processes may be employed to determine the parameters for the neurons based on the representation information of a respective frame and the known action labels. The objective for training the learning network 300 may be represented as any other form as long as the objective is to reduce the difference between the label vector $y_t$ and the actual label vector $z_t$ for a specific frame.

The learning network 300 with the trained parameters can be used to detect an action label (or the label vector) for each incoming frame in real time. In some implementations, when receiving representation information of an incoming frame of a video, the feature learning sub-network 310 may extract features for the frame based on the representation information. Specifically, the first layer of the feature learning sub-network 310, for example, the RNN layer 312 with corresponding predetermined parameters, may output initial features based on the representation information. In some examples, the outputs of the RNN layer 312 may be determined based on Equations (3-1) or (3-2) to (7) as described above. The initial features may be transmitted to the next layer, for example, the FC layer 314, for non-linear processing. The features may be updated by the FC layer 314 based on Equation (8) as described above.

The processing on the RNN layer and the FC layer may be performed in an alternate way depending on the structure of the learning network. The output response from the last layer of the feature learning sub-network 310 is the learned features for the incoming frame. In some implementations, the classification sub-network 320, for example, the Soft-Max layer 324, may generate a probability of the frame being associated with a predefined action label(s) based on the features. In the cases where the classification sub-network 320 includes an additional FC layer, for example, the FC layer 322, the features may be further updated by the FC layer 322 before being transmitted to the SoftMax layer 324.

The SoftMax layer 324 may generate a label vector including one or more probabilities for corresponding predefined action labels. In some implementations, the highest probability in the label vector may indicate that the current frame includes an action corresponding to the action label. For example, the SoftMax layer 324 may output a label vector $y_t = \{y_{t,0}, \ldots, y_{t,k}, \ldots, y_{t,M}\}$ for an input frame $v_t$. If the element $y_{t,k}$ has the highest value, then the frame $v_t$ is detected to include an action classified for the action label k. In some examples, probabilities of the elements in the label vector may be compared with a threshold, and the frame $v_t$ may be determined to be associated with one or more action labels with respective probabilities in the label vector higher than the threshold.

A learning network with the ability to provide on-line action detection is described above with reference to FIG. 3. In general, the learning network 300 can correctly detect an action from the frame in which the action starts to the frame in which the action ends. In some implementations, as mentioned above, it might be expected to forecast the start and/or end of an action prior to their occurrence.

Figure 4:
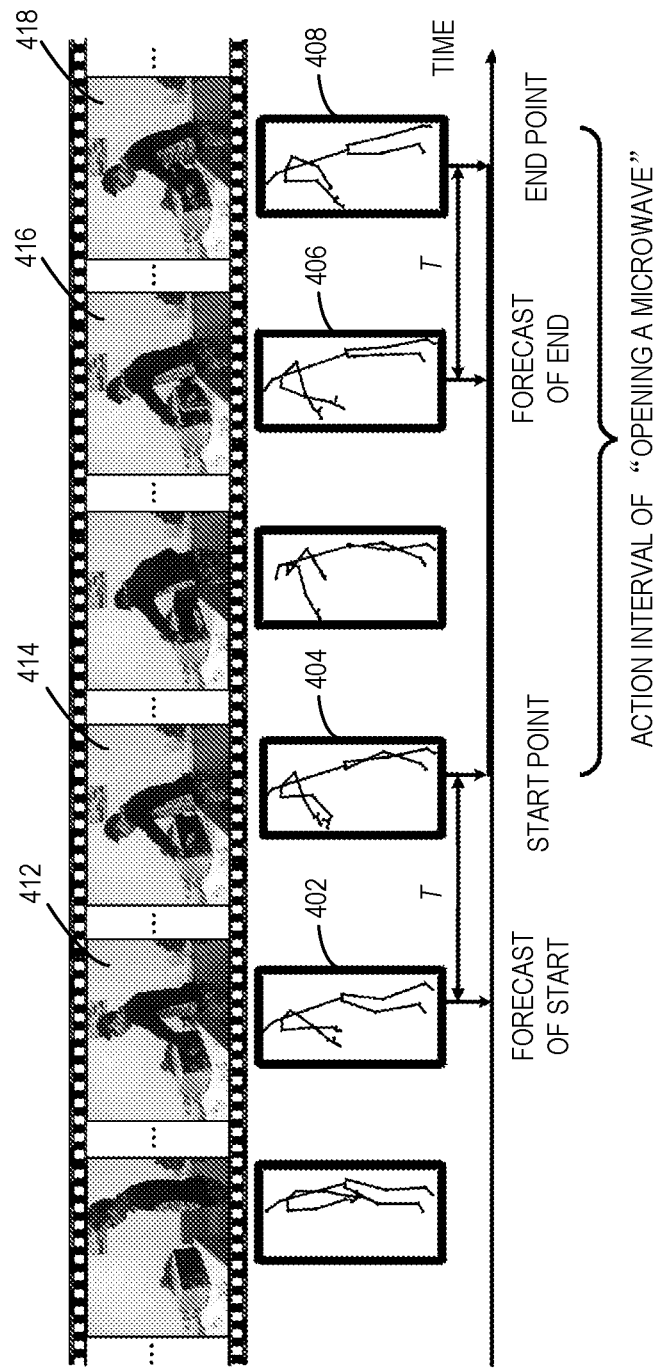
FIG. 4 illustrates a schematic diagram for the detection and forecast of an action in accordance with one implementation of the subject matter described herein.

FIG. 4 shows a schematic diagram for the detection and forecast of an action. As shown, images 402-408 are corresponding to frames 412-418 of a streaming video and include skeleton representations of these frames, respectively. The trained learning network 300 may be used to correctly detect an action of "opening a microwave" from the frame 414 at the start point based on representation information in the corresponding image 404. The learning network 300 may also be used to detect the action from the frames within the action interval until the frame 418 at the end point of that action. In some cases, it would be desirable if a learning network is capable of forecasting the start of the action in a period of T frames earlier than the start point, for example, from the frame 412. It would also be desirable to forecast the end of the action from the frame 416 which is T frames earlier than the end point of the action.

Figure 5:
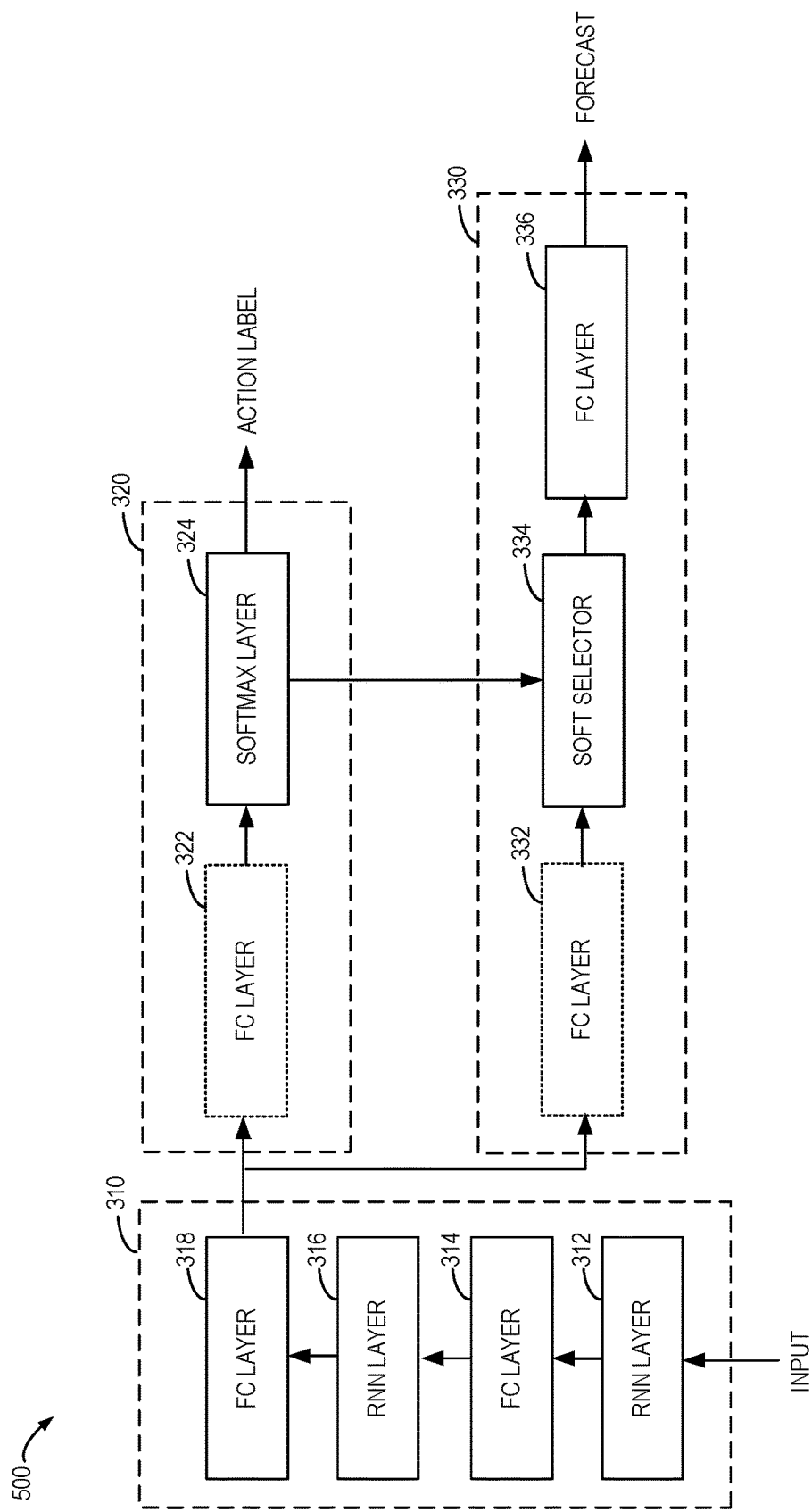
FIG. 5 illustrates a block diagram of a structure of a learning network in accordance with another implementation of the subject matter described herein.

In some implementations, a regression sub-network may be added into the learning network to forecast whether an action will take place or terminate in the near future. FIG. 5 shows a block diagram of such learning network 500. The feature learning sub-network 310 and the classification sub-network 320 included in the learning network 500 function substantially the same as described with reference to FIG. 3. Additionally, the learning network 500 includes a regression sub-network 330 to perform the forecast task. The feature learning sub-network 310 may be shared by the classification sub-network 320 and the regression sub-network 330.

In some implementations, the regression sub-network 330 may be designed to determine a confidence for a current frame to measure the possibility of the frame being a special frame in which a certain action starts. The confidence may be determined based on a time gap between the current frame and the special frame at the start point. The confidence may increase when this frame is near to the start point over time. Alternatively, or in addition, the regression sub-network 330 may determine another confidence for each frame in a similar way to measure the possibility of the frame being another special frame when a certain action ends. In some examples, confidences for different frames may be described as a curve with a peak point, with the peak point indicating that the frame being the special frame. The curve may include, but is not limited to, a Gaussian-like curve or a triangle-like curve.

Figure 6:
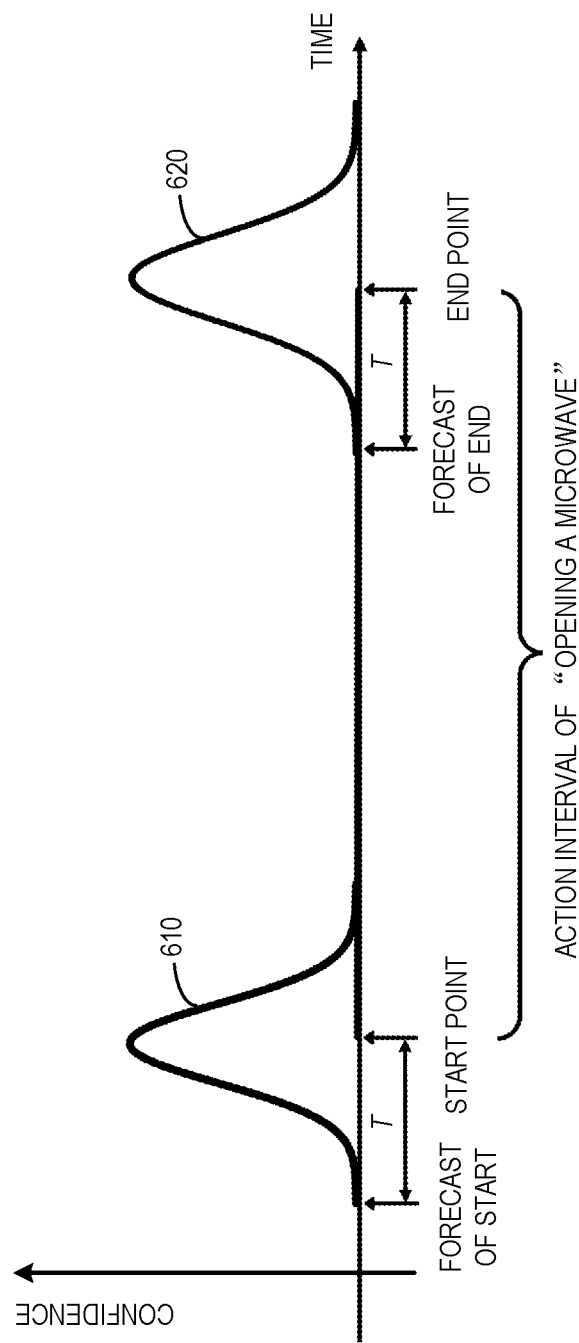
FIG. 6 illustrates a schematic diagram for two example Gaussian-like confidence curves for the forecasts of the start and end points of an action in accordance with another implementation of the subject matter described herein.

FIG. 6 shows a schematic diagram for two example Gaussian-like confidence curves 610 and 620 for the forecasts of the start and end points of the action "opening a microwave" in FIG. 4. It can be seen from the curve 610 that, a lower confidence for the current frame indicates that this frame has a larger distance from the start point of the action. If the confidence is determined to have a peak confidence, it means that the current frame is the frame in which that action starts. In a similar way, the curve 620 shows that a confidence for a frame increases when this frame is near to the end point of the action.

In some examples, with respect to the start point of an action j, a confidence of a frame $v_t$ at a point of time t in a Gaussian-like curve may be represented as below:

$$c_t^s = e^{-(t-s_j)^2/2\sigma^2} \qquad (13)$$

where $s_j$ is the frame in which an action j starts, $c_t^s$ is the confidence of the frame $v_t$ being the frame $s_j$, and $\sigma$ is a predetermined parameter which controls the shape of the confidence curve. It can be seen that for the frame at the start point, for example, for $t=s_j$, the confidence $c_t^s$ has its peak value of 1. A confidence $c_t^e$ of a frame $v_t$ being the frame $e_j$ at the end point of an action j may be defined in a similar way as in Equation (13). In some other examples, the shapes of the confidence curves for the forecasts of the start and end points may be different.

In some implementations, the target of the regression sub-network 330 may be designed to automatically provide the confidence(s) for a frame being the start and/or end points of an action based on the features of this frame learned by the feature learning sub-network 310. In some implementations, in order to enable the regression sub-network 330 to perform forecast tasks for all the predefined actions (each of which may have different start and/or end points), the outputs of the classification sub-network 320 may be used to guide the forecast tasks. Therefore, as shown in FIG. 5, the regression sub-network 330 may include a soft selector 334 to integrate the probabilities from the classification sub-network 320 and play a role of feature selection for different actions. The soft selector 334 may process the features for an input frame from the feature learning sub-network 310 based on the probabilities of the frame being associated with the predefined action labels from the classification sub-network 320. The soft selector 334 is also referred to as a feature processing element (or neuron) in the learning network 500.

In some implementations, the soft selector 334 may multiply the features by the probabilities for the predefined action labels. As mentioned above, the number of the probabilities is equal to the number of the predefined action labels. In some examples, the features may be divided into a number of feature sets with the number of the feature sets equal to the number of the predefined action labels. Each of the feature sets may be multiplied by one of the probabilities. In some implementations, to facilitate the probability-based feature processing, the number of neurons in the last layer (for example, the FC layer 318) of the feature learning sub-network 310 may be a multiple of the number of the predefined action labels. In some other implementations, the regression sub-network 330 may include a FC layer 332 for feature fusion and the number of non-linear processing neurons included in the FC layer 322 may be a multiple of the number of the predefined action labels.

Figure 7:
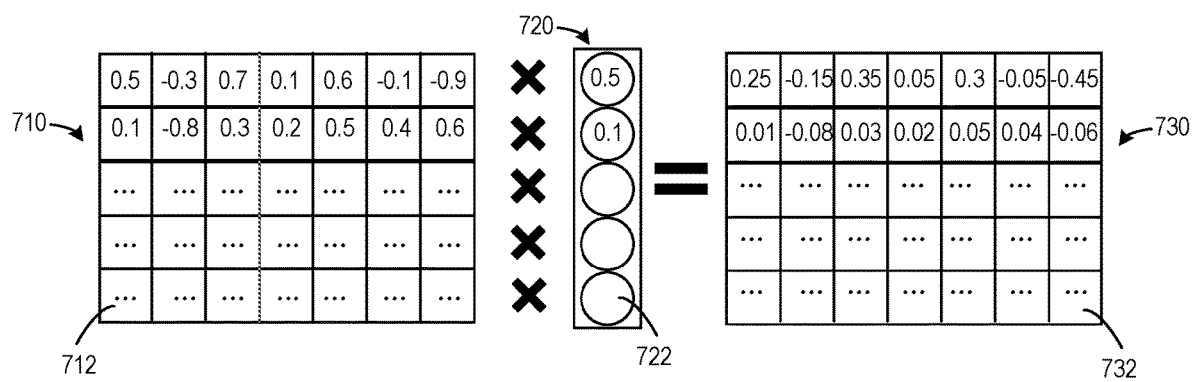
FIG. 7 illustrates a schematic diagram of an example process of feature processing in accordance with one implementation of the subject matter described herein.

FIG. 7 shows a schematic diagram of an example process of feature processing in the soft selector 334. As shown, thirty-five features 712 from the last layer 318 of the feature learning sub-network 310 or the FC layer 332 of the regression sub-network 330 (if being included) are arranged in a matrix 710 with each row including seven features 712. Each row of features is multiplied by one of the five probabilities 722 from the classification sub-network 320, resulting in a matrix 730 including thirty-five processed features 732. For simplicity, only values for the features in first two rows of the matrices 710 and 730 are shown as well as values of the first two probabilities. It would be appreciated that the numbers of features and predefined action labels are given for illustration, and any other numbers of features and predefined action labels may be set.

Based on the processed features, the regression sub-network 330 may include a FC layer 336 to determine confidence(s) of the input frame being the frame at the start point of an action and/or the frame at the end point of the action. The FC layer 336 may include a neuron for the forecast of the start point of an action. Alternatively, or in addition, the FC layer 336 may include another neuron for the forecast of the end point of an action. The neuron(s) included in FC layer 336 may determine output response according to Equation (8). In some implementations, the regression sub-network 330 may be trained to determine the parameters for the neuron(s) in the FC layers so that the output(s) of the FC layers can indicate the confidence(s).

In order to train the regression sub-network 330, in some implementations, time information indicating a point of time at a frame in which a predefined action starts or ends may be included in the training dataset. The parameters for the neuron(s) in the FC layer may also be determined based on the time information. The objective for training the FC layer 336 is to reduce or minimize a difference between a confidence generated by the FC layer 336 for an input frame and the actual confidence for this frame with respect to the start point. That is, the FC layer 336 is trained to provide a confidence curve for an action to be detected that is similar to or the same as the actual confidence curve defined by the actual start point of this action. The objective for training the FC layer 336 with respect to the end point is similar. Therefore, in the cases where both the forecasts of the start and end points are considered, the objective function for training the regression sub-network 330 is to reduce or minimize the loss function for each input frame as follows:

$$\min(L_r(v_t)) = \min(l(c_t^s, p_t^s) + l(c_t^e, p_t^e)) \quad (14)$$

where $L_r(v_t)$ represents the loss function of the regression sub-network 330 for an input frame $v_t$, $c_t^s$ and $c_t^e$ represent the actual confidences of the frame $v_t$ being the frame at the start point and being the frame at the end point of a nearest action, respectively, $p_t^s$ and $p_t^e$ represent the confidences predicted by the FC layer 336, respectively, and l is the loss function for the forecast of the start point or the end point, such as $l(x, y) = (x-y)^2$. It would be appreciated that the loss function may be in other forms.

In some implementations, the parameters of the neuron(s) in the FC layer 336 may be updated in an interaction manner based on the processed features from the soft selector 334 and the confidence(s) generated by the neuron(s) with the parameters determined previously. The parameters may be initialized to, for example, some random values and then may be increased or decreased by small values each time until convergence reaches. It can be seen from Equation (14) that the parameters may be increased or decreased by reducing or minimizing the difference between the resulting confidence $p_t^s$ and the actual confidence $c_t^e$ as well as the resulting confidence $p_t^e$ and the actual confidence $c_t^e$.

In some implementations, to facilitate the training of the regression sub-network 330, frames that are prior to the frame(s) at the start point and/or the end point of a predefined action within a predetermined period of time (for example, a period of T frames as shown in FIGS. 4 and 6) may also be labeled as being associated with this action. That is, a time gap between the respective labeled frames and the start point or the end point may be lower than the predefined period of time. As an example, an action label $z_{t,k}^s$, for a frame $v_t$ may be set as a value of 1 in the training dataset with $t_{t,start} - T \leq t < t_{t,start}$ for a predefined action k, where $t_{t,start}$ is the start point of the action k. As another example, an action label $z_{t,h}^e$, for a frame $v_t$ may be set as a value of 1 with $t_{t,end} - T \leq t < t_{t,end}$ and $t_{t,end}$ is the end point of the action k.

In some implementations, the objective function for training the regression sub-network 330 may be designed to obtain the minimum results for frames over a period of time. The objective function for training the regression sub-network 330 may be rewritten as follows:

$$\min(L_r(V)) = \min\left(\frac{1}{N}\sum_{t=0}^{N-1}(\ell(c_t^s, p_t^s) + \ell(c_t^e, p_t^e))\right) \quad (15)$$

where $L_r(V)$ represents the loss function for a video clip with N frames, and N represents the number of frames considered to minimize the loss function. In some examples, N may be the total number of frames in a video. In some other examples, N may be a predetermined number of frames.

In some implementations, the parameters for the neurons included in the feature learning sub-network 310 may be updated based on the confidence(s) generated by the regression sub-network 330, for example, through the BPTT method. In these implementations, if the confidence(s) generated by the FC layer 336 will cause the updating of the parameters for the FC layer 336, then the parameters for the feature learning sub-network 310 may be updated accordingly to improve the convergence of the regression sub-network 330.

In some implementations, the training of the feature learning sub-network 310 and the classification sub-network 320 may be performed first as discussed above with reference to FIG. 3. With the parameters of the classification sub-network 320 determined and fixed, the outputs of the classification sub-network 320 may be then used to guide the training of the regression sub-network 330. The parameters for the neuron(s) included in the FC layer 336 may be updated as well as those for the FC layer 332 (if included). During the training of the regression sub-network 330, the parameters of the feature learning sub-network 310 may be updated, which may indirectly improve the outputs of the classification sub-network 320. In some implementations, by considering both the objective functions of the learning network 300 in Equation (12) and the regression sub-network 330 in Equation (15), the objective function for training the learning network 500 may be represented as follows:

$$\min L_j(V) = \min(L_c(V) + \lambda L_r(V)) \quad (16)$$

$$= \min\left(-\frac{1}{N}\sum_{t=0}^{N-1}\left[\left(\sum_{k=0}^{M}z_{t,k}\ln P(y_{t,k} \mid v_0, \ldots, v_t)\right) + \lambda \cdot (\ell(c_t^s \cdot p_t^s) + \ell(c_t^e, p_t^e))\right]\right)$$

where λ is a weight for the forecast task of the regression sub-network 330. During the training of the classification sub-network 320, λ may be set to 0. When it starts to train the regression sub-network 330, λ may be set to 1.

With the parameters for the neurons included in the learning network 500 determined, the trained learning network 500 may be used to detect an action for each incoming frame through the classification sub-network 320 and indicate whether the action will take place or terminate in the near future through the regression sub-network 330. The action detection of the classification sub-network 320 has been discussed above. In some implementations, the features for the incoming frame may be processed in the FC layer 332 for feature fusion. The features output from the FC layer 332 may be processed in the soft selector 334 based on the probabilities for the current frame generated by the SoftMax layer 324. In some examples, the features output from the FC layer 332 may be multiplied by the probabilities of the current frame being associated with the predefined action labels.

The resulting features may be used as inputs to the FC layer 336 to determine a first confidence for the current frame being the frame in which an action starts and/or a second confidence for the current frame being the frame in which an action ends. In some implementations, if the first confidence or the second confidence is higher than a threshold, for example, a threshold of 0.6, it can be determined that an action will take place or terminate soon. The output of the SoftMax layer 324 may indicate to which action the output of the FC layer 336 is referred.

Figure 8:
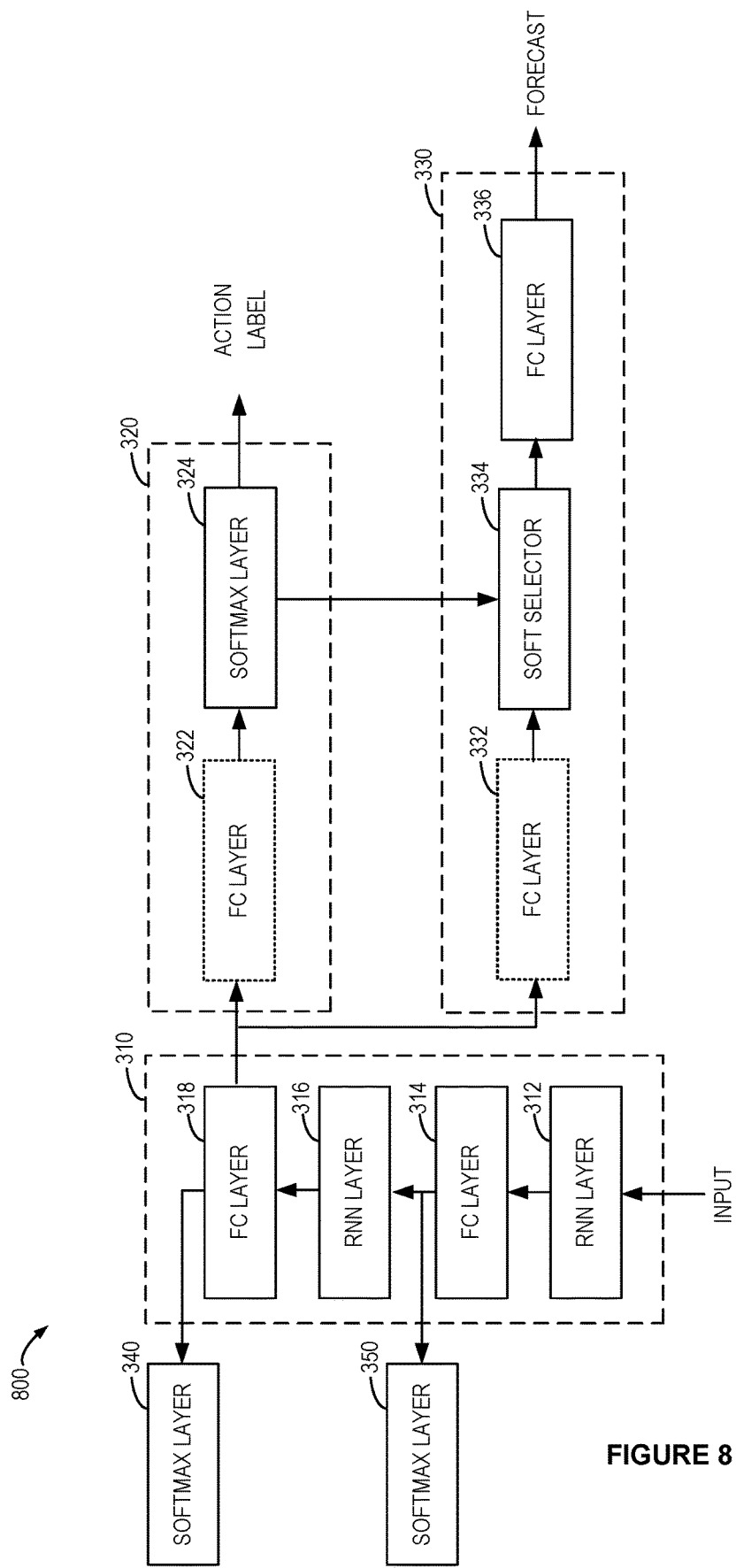
FIG. 8 illustrates a block diagram of a structure of a learning network in accordance with yet another implementation of the subject matter described herein.

In many realistic use cases, especially for on-line action detection, there usually exist a period of idle time between some actions of interest. In order to accelerate the action detection, it is desirable that background frames or negative frames (which are generally marked as a blank action label indicating there is no action included in these frames) may be discarded from the learning network as soon as possible to save the computation resources. FIG. 8 shows a block diagram of a learning network 800 in a cascaded structure which is capable of achieving the discarding of the features.

As shown, a SoftMax layer 330 including neurons is added in the learning network 800 and receives the outputs of features of an input frame from the FC layer 314 in the feature learning sub-network 310. A further SoftMax layer 340 is added to receive the outputs of features of an input frame from the subsequent FC layer 318. The SoftMax layers 330 and 340 are used to determine whether the input frame being associated with a predefined action label indicating the frame includes no action. If one of the SoftMax layers determines that the probability of the frame being associated with that predefined action label (no action) is higher than a threshold, the received features may be discarded and may not be passed into the subsequent layers.

In the implementation shown in FIG. 8, features obtained from the frames that do not include predefined actions may be discarded from the learning network 800 as soon as possible, so that the remaining part of the learning network 800 may not need to perform operations, thereby saving the computation resources for both the training process and the executing process of this learning network. That is, only if the probability of the frame being associated with that specific action label is below a threshold, the features may be passed to be used to train the parameters for the neurons included in the remaining part of the learning network 800 in the training process or used to generate the outputs of the sub-networks 320 and 330 in the executing process.

In some implementations, the SoftMax layers 330 and 340 may be designed as two-way SoftMax layers which determine two probabilities for a first case where the input frame includes any of the predefined actions and for a second case where the input frame include no action. In this case, there may be two neurons in the respective SoftMax layers 330 and 340, each used for determining one of the probabilities. The training process and the executing process of the SoftMax layers 330 and 340 are similar to that of the SoftMax layer 324 and are not repeated here for simplicity.

It would be appreciated that although two SoftMax layers are shown to be included in the learning network 800 for feature discarding, in some other implementations, only one SoftMax layer or more than two SoftMax layers may be included in the learning network. It would also be appreciated that any of the SoftMax layers may be connected to the outputs of the RNN layers instead of the FC layers. In some implementations, some additional FC layers for feature fusion may be added between the SoftMax layers and the outputs from some layers of the feature learning sub-network 310.

It would be appreciated that the learning networks or neural networks discussed above are available in a variety of architectures and can be implemented in hardware, software or a combination of hardware and software. In some implementations, the learning networks may be trained in the learning unit 116 in FIG. 1 with the representation information for the training frames from the representation extractor 114 and the corresponding predefined labels in the training dataset 112. In some implementations, the structure and the parameters of the elements in the learning networks may be provided to the executing unit 126. With the representation information of an input frame extracted by the representation extractor 124, the executing unit 126 may perform action detection (and probably the forecasts of the start and end points of an action) based on the structure and the parameters of the elements in the learning networks.

Figure 9:
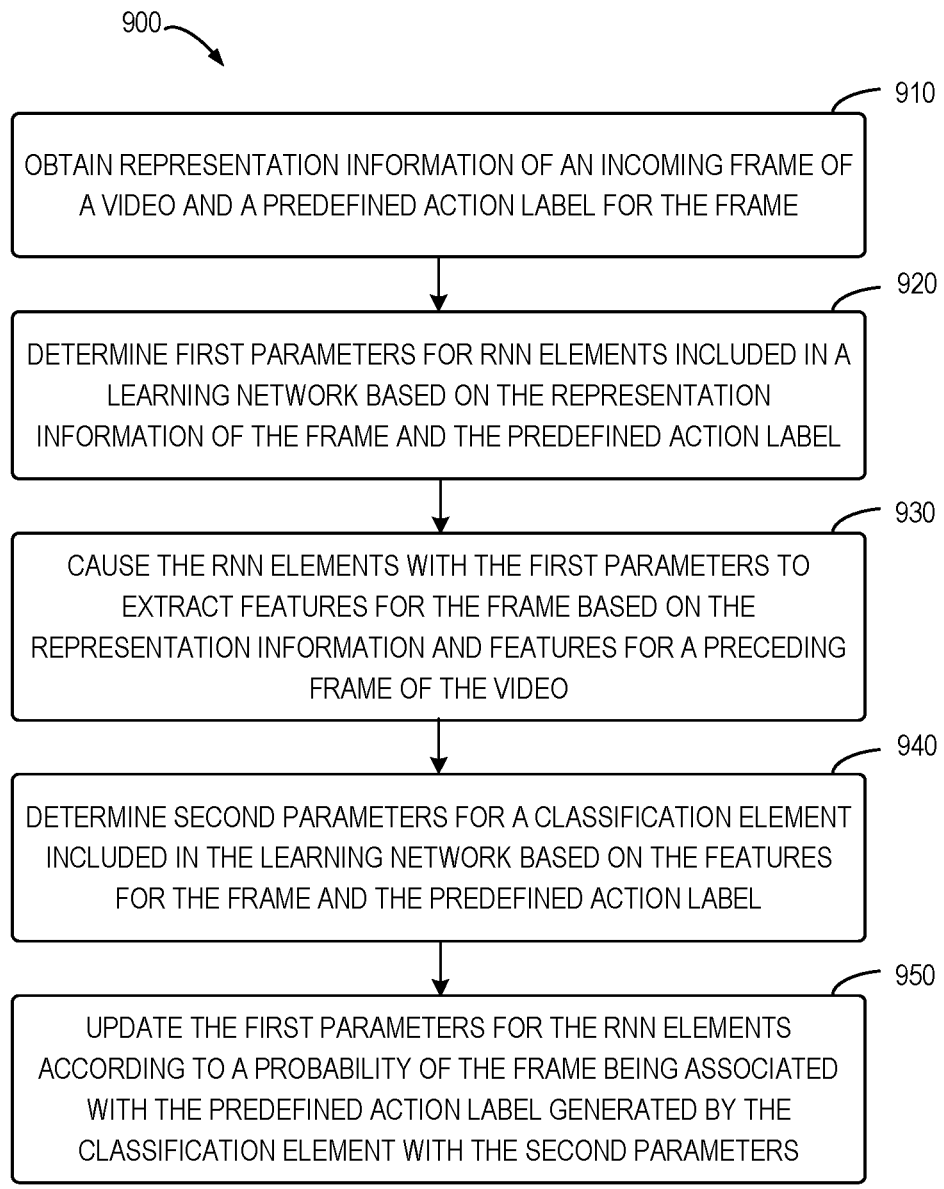
FIG. 9 illustrates a flowchart of a method of action detection in accordance with one implementation of the subject matter described herein.

FIG. 9 shows a flowchart of a method of action detection 900 in accordance with one implementation of the subject matter described herein. In step 910, representation information of an incoming frame of a video and a predefined action label for the frame are obtained. The representation information represents an observed entity in the frame. In some implementations, the representation information includes skeleton representation associated with the observed entity. In step 920, first parameters for RNN elements included in a learning network may be determined based on the representation information of the frame and the predefined action label.

Then in step 930, the RNN elements with the first parameters are caused to extract features for the frame based on the representation information and features for a preceding frame of the video. In step 940, second parameters for a classification element included in the learning network are determined based on the features for the frame and the predefined action label. The first parameters for the RNN elements are updated in step 950 according to a probability of the frame being associated with the predefined action label generated by the classification element with the second parameters.

In some implementations, the predefined action label may indicate a predefined action of the observed entity and the learning network may further include a feature processing element and a forecast element. In these implementations, time information about a special frame in which the action starts or ends may be obtained. The feature processing element may be caused to process the features for the frame based on the probability, and third parameters for the forecast element may be determined based on the processed features and the time information. The third parameters may then be updated according to a confidence of the frame being the special frame generated by the forecast element with the third parameters.

In some implementations, if the frame is prior to the special frame in the video, a time gap between the frame and the special frame may be within a predetermined period of time.

In some implementations, updating the first parameters may include updating the first parameters for the RNN elements based on the confidence.

In some implementations, the predefined action label may indicate that the frame includes no action and the learning network may further include a further classification element. In these implementations, fourth parameters for the further classification element may be determined based on the features and the predefined action label. The further classification element with the fourth parameters may be caused to generate a further probability of the frame being associated with the predefined action label. In response to the further probability being below a threshold, the determining of the second parameters based on the features may be caused to be performed.

In some implementations, the learning network may further include feature fusion elements. In these implementations, fifth parameters for the feature fusion elements may be determined based on the features extracted by the RNN elements and the predefined action label. The feature fusion elements with the fifth parameters may be caused to update the features based on a non-linear function, and the classification element may be caused to determine the probability based on the updated features.

Figure 10:
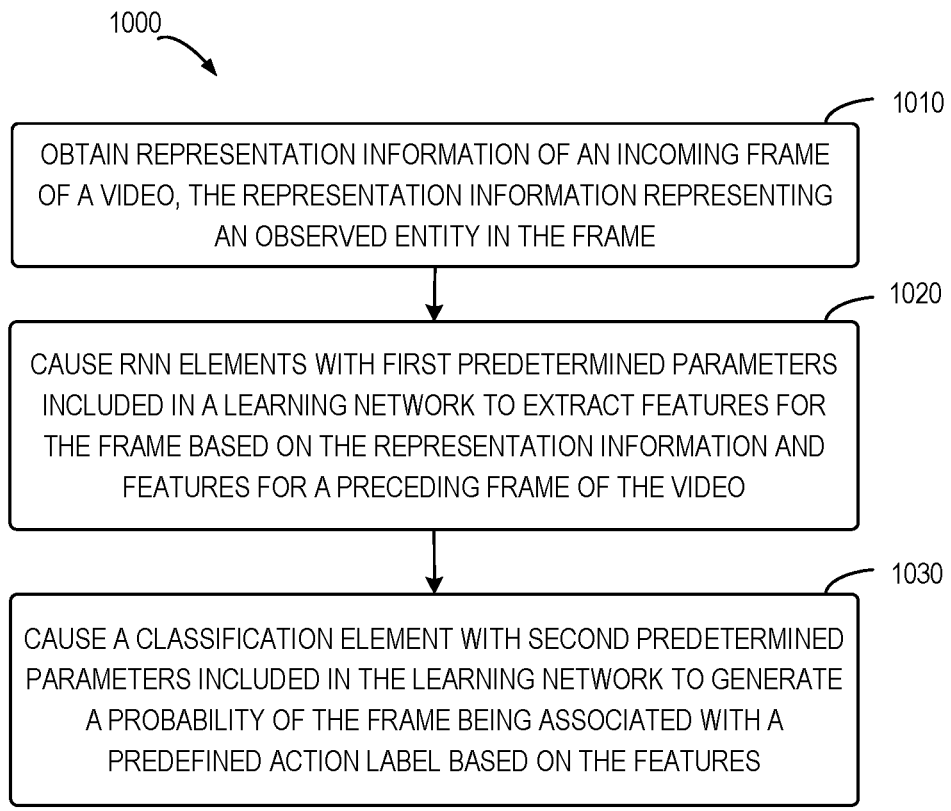
FIG. 10 illustrates a flowchart of a method of action detection in accordance with another implementation of the subject matter described herein.

FIG. 10 shows a flowchart of a method of action detection 1000 in accordance with another implementation of the subject matter described herein. In step 1010, representation information of an incoming frame of a video is obtained. The representation information represents an observed entity in the frame. In some implementations, the representation information includes skeleton representation associated with the observed entity. In step 1020, RNN elements with first predetermined parameters included in a learning network may be caused to extract features for the frame based on the representation information and features for a preceding frame of the video. Then in step 1030, a classification element with second predetermined parameters included in the learning network may be caused to generate a probability of the frame being associated with a predefined action label based on the features.

In some implementations, the predefined action label indicates a predefined action of the observed entity and the learning network further includes a feature processing element and a forecast element. In these implementations, the feature processing element may be caused to process the features based on the probability, and the forecast element with third predetermined parameters may be caused to generate a confidence of the frame being a special frame in which the action starts or ends based on the processed features. In response to the confidence exceeds a threshold, a forecast for the special frame may be determined.

In some implementations, the predefined action label indicates that the frame includes no action, and the learning network further includes a further classification element. In these implementations, the further classification element with fourth predetermined parameters may be caused to generate a further probability of the frame being associated with the predefined action label based on the features. In response to the further probability being below a threshold, the classification element may be caused to generate the probability based on the features.

In some implementations, the learning network further includes feature fusion elements. The feature fusion elements with fifth predetermined parameters may be caused to update the features based on a non-linear function, and the classification element may be caused to determine the probability based on the updated features.

Figure 11:
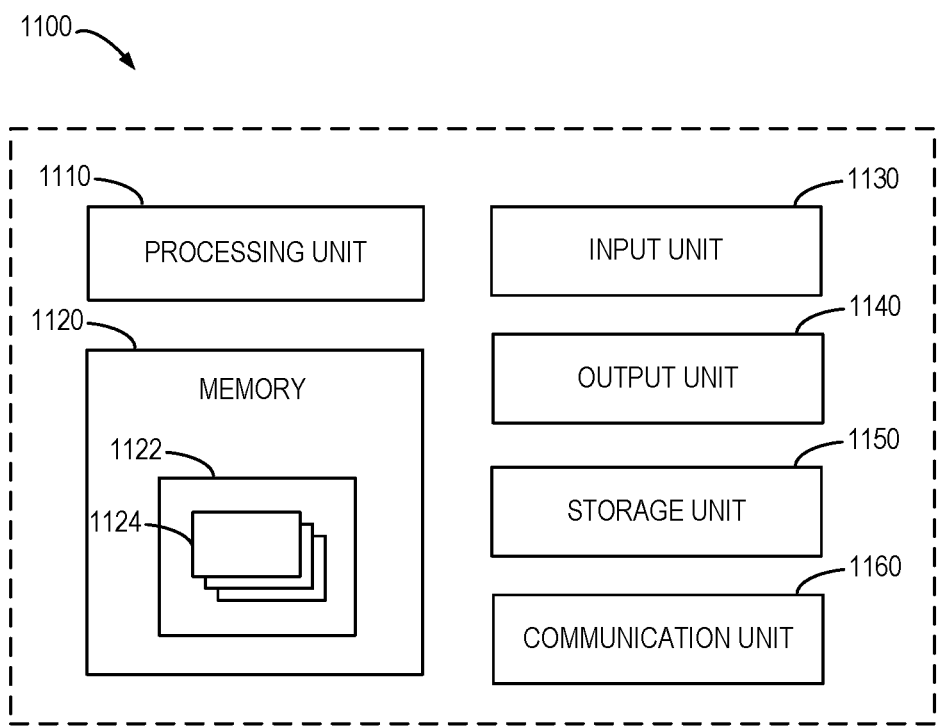
FIG. 11 illustrates a block diagram of an example computing system/server in which one or more implementations of the subject matter described herein may be implemented.

FIG. 11 shows a block diagram of an example computing system/server 1100 in which one or more implementations of the subject matter described herein may be implemented. The model building system 110, the model executing system 120, or both of them may be implemented by the computing system/server 1100. The computing system/server 1100 as shown in FIG. 11 is only an example, which should not be constructed as any limitation to the function and scope of use of the implementations of the subject matter described herein.

As shown in FIG. 11, the computing system/server 1100 is in a form of a general-purpose computing device. Components of the computing system/server 1100 may include, but are not limited to, one or more processors or processing units 1110, a memory 1120, one or more input devices 1130, one or more output devices 1140, storage 1150, and one or more communication units 1160. The processing unit 1110 may be a real or a virtual processor and is capable of performing various processes in accordance with a program stored in the memory 1120. In a multi-processing system, multiple processing units execute computer-executable instructions to increase processing power.

The computing system/server 1100 typically includes a variety of machine readable medium. Such medium may be any available medium that is accessible by the computing system/server 1100, including volatile and non-volatile medium, removable and non-removable medium. The memory 1120 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 1150 may be removable or non-removable, and may include machine readable medium such as flash drives, magnetic disks or any other medium which can be used to store information and which can be accessed within the computing system/server 1100.

The computing system/server 1100 may further include other removable/non-removable, volatile/non-volatile computing system storage medium. Although not shown in FIG. 11, a disk driver for reading from or writing to a removable, non-volatile disk (e.g., a "floppy disk"), and an optical disk driver for reading from or writing to a removable, non-volatile optical disk can be provided. In these cases, each driver can be connected to the bus 18 by one or more data medium interfaces. The memory 1120 may include at least one program product having a set (e.g., at least one) of program modules that are configured to carry out the functions of various implementations of the subject matter described herein.

A program/utility tool 1122 having a set (at least one) of the program modules 1124 may be stored in, for example, the memory 1120. Such program modules 1124 include, but are not limited to, an operating system, one or more applications, other program modules, and program data. Each or a certain combination of these examples may include an implementation of a networking environment. The program modules 1124 generally carry out the functions and/or methodologies of implementations of the subject matter described herein, for example, the method 900 and/or the method 1000.

The input unit(s) 1130 may be one or more of various different input devices. For example, the input unit(s) 1130 may include a user device such as a mouse, keyboard, trackball, etc. The communication unit(s) 1160 enables communication over communication medium to another computing entity. Additionally, functionality of the components of the computing system/server 1100 may be implemented in a single computing machine or in multiple computing machines that are able to communicate over communication connections. Thus, the computing system/server 1100 may operate in a networked environment using logical connections to one or more other servers, network personal computers (PCs), or another common network node. By way of example, and not limitation, communication media include wired or wireless networking techniques.

The computing system/server 1100 may also communicate, as required, with one or more external devices (not shown) such as a storage device, a display device, and the like, one or more devices that enable a user to interact with the computing system/server 1100, and/or any device (e.g., network card, a modem, etc.) that enables the computing system/server 1100 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some implementations of the subject matter described herein are listed below.

In some implementations, a device is provided. The device comprises a processing unit and a memory coupled to the processing unit and storing instructions thereon, the instructions, when executed by the processing unit, performing acts including: obtaining representation information of an incoming frame of a video and a predefined action label for the frame, the representation information representing an observed entity in the frame; determining first parameters for recurrent neural network (RNN) elements included in a learning network based on the representation information of the frame and the predefined action label; causing the RNN elements with the first parameters to extract features for the frame based on the representation information and features for a preceding frame of the video; determining second parameters for a classification element included in the learning network based on the features for the frame and the predefined action label; and updating the first parameters for the RNN elements according to a probability of the frame being associated with the predefined action label generated by the classification element with the second parameters.

In some implementations, the predefined action label indicates a predefined action of the observed entity, the learning network further includes a feature processing element and a forecast element, the acts further comprising: obtaining time information about a special frame in which the action starts or ends; causing the feature processing element to process the features for the frame based on the probability; determining third parameters for the forecast element based on the processed features and the time information; and updating the third parameters according to a confidence of the frame being the special frame generated by the forecast element with the third parameters.

In some implementations, if the frame is prior to the special frame in the video, a time gap between the frame and the special frame is within a predetermined period of time.

In some implementations, the acts further comprise: causing the forecast element with the third parameters to generate the confidence based on a time gap between the frame and the special frame.

In some implementations, updating the first parameters further comprises updating the first parameters for the RNN elements based on the confidence.

In some implementations, the predefined action label indicates that the frame includes no action, and the learning network further includes a further classification element, the acts further comprising determining fourth parameters for the further classification element based on the features and the predefined action label; causing the further classification element with the fourth parameters to generate a further probability of the frame being associated with the predefined action label; and in response to the further probability being below a threshold, causing the determining of the second parameters based on the features.

In some implementations, the learning network further includes feature fusion elements, the acts further comprising: determining fifth parameters for the feature fusion elements based on the features extracted by the RNN elements and the predefined action label; causing the feature fusion elements with the fifth parameters to update the features based on a non-linear function; and causing the classification element to determine the probability based on the updated features.

In some implementations, the RNN elements include long short-term memory (LSTM) elements.

In some implementations, the representation information includes skeleton representation associated with the observed entity.

In some implementations, a device is provided. The device comprises a processing unit and a memory coupled to the processing unit and storing instructions thereon, the instructions, when executed by the processing unit, performing acts including: obtaining representation information of an incoming frame of a video, the representation information representing an observed entity in the frame; causing recurrent neural network (RNN) elements with first predetermined parameters included in a learning network to extract features for the frame based on the representation information and features for a preceding frame of the video; and causing a classification element with second predetermined parameters included in the learning network to generate a probability of the frame being associated with a predefined action label based on the features.

In some implementations, the predefined action label indicates a predefined action of the observed entity, and the learning network further includes a feature processing element and a forecast element, the acts further comprising: causing the feature processing element to process the features based on the probability; causing the forecast element with the third predetermined parameters to generate a confidence of the frame being a special frame in which the action starts or ends based on the processed features; and in response to the confidence exceeds a threshold, determining a forecast for the special frame.

In some implementations, the predefined action label indicates that the frame includes no action, and the learning network further includes a further classification element, the acts further comprising: causing the further classification element with the fourth predetermined parameters to generate a further probability of the frame being associated with the predefined action label based on the features, and in response to the further probability being below a threshold, causing the classification element to generate the probability based on the features.

In some implementations, the learning network further includes feature fusion elements, the acts further comprising: causing the feature fusion elements with fifth predetermined parameters to update the features based on a non-linear function; and causing the classification element to determine the probability based on the updated features.

In some implementations, the representation information includes skeleton representation associated with the observed entity.

In some implementations, a computer-implemented method is provided. The method comprising: obtaining representation information of an incoming frame of a video and a predefined action label for the frame, the representation information representing an observed entity in the frame; determining first parameters for long short-term memory (LSTM) elements included in a learning network based on the representation information of the frame and the predefined action label; causing the RNN elements with the first parameters to extract features for the frame based on the representation information and features for a preceding frame of the video; determining the second parameters for a classification element included in the learning network based on the features for the frame and the predefined action label; and updating the first parameters for the RNN elements according to a probability of the frame being associated with the predefined action label generated by the classification element with the second parameters.

In some implementations, the predefined action label indicates a predefined action of the observed entity and the learning network further includes a feature processing element and a forecast element, the method further comprising: obtaining time information about a special frame in which the action starts or ends; causing the feature processing element to process the features for the frame based on the probability; determining the third parameters for the forecast element based on the processed features and the time information; and updating the third parameters according to a confidence of the frame being the special frame generated by the forecast element with the third parameters.

In some implementations, if the frame is prior to the special frame in the video, a time gap between the frame and the special frame is within a predetermined period of time.

In some implementations, the method further comprises causing the forecast element with the third parameters to generate the confidence based on a time gap between the frame and the special frame.

In some implementations, updating the first parameters further comprises updating the first parameters for the RNN elements based on the confidence.

In some implementations, the predefined action label indicates that the frame includes no action and the learning network further includes a further classification element, the method further comprising: determining the fourth parameters for the further classification element based on the features and the predefined action label; causing the further classification element with the fourth parameters to generate a further probability of the frame being associated with the predefined action label; and in response to the further probability being below a threshold, causing the determining of the second parameters based on the features.

In some implementations, the learning network further includes feature fusion elements, the method further comprising: determining fifth parameters for the feature fusion elements based on the features extracted by the RNN elements and the predefined action label; causing the feature fusion elements with the fifth parameters to update the features based on a non-linear function; and causing the classification element to determine the probability based on the updated features.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:
1. A device comprising:
a processing unit;
a memory coupled to the processing unit and storing instructions thereon, the instructions, when executed by the processing unit, performing acts including:
obtaining representation information of an incoming frame of a video and a predefined action label for the frame, the representation information representing an observed entity in the frame;
determining first parameters for recurrent neural network (RNN) elements included in a learning network based on the representation information of the frame and the predefined action label;
causing the RNN elements with the first parameters to extract features for the frame based on the representation information and features for a preceding frame of the video;
determining second parameters for a classification element included in the learning network based on the features for the frame and the predefined action label; and
updating the first parameters for the RNN elements according to a probability of the frame being associated with the predefined action label generated by the classification element with the second parameters.

2. The device of claim 1, wherein the predefined action label indicates a predefined action of the observed entity, and the learning network further includes a feature processing element and a forecast element, the acts further comprising:
obtaining time information about a special frame in which the action starts or ends;
causing the feature processing element to process the features for the frame based on the probability;

determining third parameters for the forecast element based on the processed features and the time information; and updating the third parameters according to a confidence of the frame being the special frame generated by the forecast element with the third parameters.

3. The device of claim 2, wherein if the frame is prior to the special frame in the video, a time gap between the frame and the special frame is within a predetermined period of time.

4. The device of claim 2, wherein updating the first parameters further comprises:

updating the first parameters for the RNN elements based on the confidence.

5. The device of claim 1, wherein the predefined action label indicates that the frame includes no action, and the learning network further includes a further classification element, the acts further comprising:

determining fourth parameters for the further classification element based on the features and the predefined action label;

causing the further classification element with the fourth parameters to generate a further probability of the frame being associated with the predefined action label; and in response to the further probability being below a threshold, causing the determining of the second parameters based on the features.

6. The device of claim 1, wherein the learning network further includes feature fusion elements, the acts further comprising:

determining fifth parameters for the feature fusion elements based on the features extracted by the RNN elements and the predefined action label;

causing the feature fusion elements with the fifth parameters to update the features based on a non-linear function; and causing the classification element to determine the probability based on the updated features.

7. The device of claim 1, wherein the RNN elements include long short-term memory (LSTM) elements.

8. The device of claim 1, wherein the representation information includes skeleton representation associated with the observed entity.

9. A device comprising:

a processing unit;

a memory coupled to the processing unit and storing instructions thereon, the instructions, when executed by the processing unit, performing acts including:

obtaining representation information of an incoming frame of a video, the representation information representing an observed entity in the frame;

causing recurrent neural network (RNN) elements with first predetermined parameters included in a learning network to extract features for the frame based on the representation information and features for a preceding frame of the video; and causing a classification element with second predetermined parameters included in the learning network to generate a probability of the frame being associated with a predefined action label based on the features.

10. The device of claim 9, wherein the predefined action label indicates a predefined action of the observed entity, and the learning network further includes a feature processing element and a forecast element, the acts further comprising:

causing the feature processing element to process the features based on the probability;

causing the forecast element with third predetermined parameters to generate a confidence of the frame being a special frame in which the action starts or ends based on the processed features; and in response to the confidence exceeds a threshold, determining a forecast for the special frame.

11. The device of claim 9, wherein the predefined action label indicates that the frame includes no action, and the learning network further includes a further classification element, the acts further comprising:

causing the further classification element with fourth predetermined parameters to generate a further probability of the frame being associated with the predefined action label based on the features; and in response to the further probability being below a threshold, causing the classification element to generate the probability based on the features.

12. The device of claim 9, wherein the RNN elements include long short-term memory (LSTM) elements.

13. A method comprising:

obtaining representation information of an incoming frame of a video and a predefined action label for the frame, the representation information representing an observed entity in the frame;

determining first parameters for recurrent neural network (RNN) elements included in a learning network based on the representation information of the frame and the predefined action label;

causing the RNN elements with the first parameters to extract features for the frame based on the representation information and features for a preceding frame of the video;

determining second parameters for a classification element included in the learning network based on the features for the frame and the predefined action label; and updating the first parameters for the RNN elements according to a probability of the frame being associated with the predefined action label generated by the classification element with the second parameters.

14. The method of claim 13, wherein the predefined action label indicates a predefined action of the observed entity, and the learning network further includes a feature processing element and a forecast element, the method further comprising:

obtaining time information about a special frame in which the action starts or ends;

causing the feature processing element to process the features for the frame based on the probability;

determining third parameters for the forecast element based on the processed features and the time information; and updating the third parameters according to a confidence of the frame being the special frame generated by the forecast element with the third parameters.

15. The method of claim 13, wherein the predefined action label indicates that the frame includes no action and the learning network further includes a further classification element, the method further comprising:

determining fourth parameters for the further classification element based on the features and the predefined action label;

causing the further classification element with the fourth parameters to generate a further probability of the frame being associated with the predefined action label; and in response to the further probability being below a threshold, causing the determining of the second parameters based on the features.

\* \* \* \* \*